United States Patent
Weldon, Jr. et al.

(10) Patent No.: US 6,275,916 B1
(45) Date of Patent: Aug. 14, 2001

(54) OBJECT ORIENTED PROGRAM MEMORY MANAGEMENT SYSTEM AND METHOD USING FIXED SIZED MEMORY POOLS

(75) Inventors: Richard S. Weldon, Jr., Plano; Robert E. Kenney, Garland; Daniel L. Miller, Dallas, all of TX (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 08/993,942

(22) Filed: Dec. 18, 1997

(Under 37 CFR 1.47)

(51) Int. Cl.$^7$ .................................................... G06F 12/00
(52) U.S. Cl. ........................ 711/170; 711/171; 711/172; 711/129
(58) Field of Search .................................. 711/171, 172, 711/129, 170, 153; 707/205, 206

(56) References Cited

U.S. PATENT DOCUMENTS

| | | | |
|---|---|---|---|
| 5,241,673 | * 8/1993 | Schelvis | 707/103 |
| 5,680,573 | * 10/1997 | Rubin et al. | 711/129 |
| 5,687,370 | * 11/1997 | Garst et al. | 707/206 |
| 5,937,434 | * 8/1999 | Hasbun et al. | 711/170 |

FOREIGN PATENT DOCUMENTS 0633531   1/1995  (EP) .

OTHER PUBLICATIONS

Cunha, et al., "The Architecture of a Memory Management Unit for Object–Oriented Systems", Computer Architecture News, vol. 19, No. 4, Jun. 1, 1991, pp. 109–116.

S. E. Keene, "Creating and Initializing Instances", Addison–Wesley Pub. Co., May 1989, pp. 155–163.

* cited by examiner

Primary Examiner—Matthew Kim
Assistant Examiner—Matthew D. Anderson
(74) Attorney, Agent, or Firm—Baker Botts L.L.P.

(57) ABSTRACT

A method for managing memory in an object oriented program that is capable of using a plurality of fixed pool classes and a plurality of objects belonging to those fixed pool classes. A plurality of memory pools each having a predetermined fixed size are constructed, with each of the plurality of fixed pool classes being associated with one of the plurality of memory pools. New objects belonging to a selected one of the fixed pool classes are instantiated, with the instantiation step including the step of allocating memory for the new object from the associated memory pool. A system for managing memory in an object oriented program operating on a computer system is also provided that includes a memory pool class and a plurality of subclasses of that memory pool class, where the object oriented program is capable of using and instantiating objects belonging to the subclasses. The system also includes a plurality of memory pools each having a predetermined fixed size, where each of the plurality of subclasses is associated with one of the plurality of memory pools, and wherein memory for objects of a selected subclass that are instantiated by the object oriented program is allocated from the associated memory pool.

20 Claims, 2 Drawing Sheets

OBJECT ORIENTED PROGRAM MEMORY MANAGEMENT SYSTEM AND METHOD USING FIXED SIZED MEMORY POOLS

TECHNICAL FIELD OF THE INVENTION

The present invention relates in general to the field of computer programming. More particularly, the invention relates to a system and method for managing memory in object oriented programs in which objects are allocated and deallocated from fixed size memory pools rather than from the heap.

BACKGROUND OF THE INVENTION

Object oriented programming is a powerful programming tool. An object oriented program is one that has as its basic foundation a set of building blocks called objects, each of which is a representation or abstraction of a physical element or a logical concept. An object is defined by a set of data that represents specific attributes or properties of the object, and a set of functions or methods that can be performed on or by the object. Each object can receive messages instructing it to perform a particular function, or send such messages to other objects. Objects are reusable, and can also be called on by a variety of different application programs.

Objects must reside in memory, and each time an object is created by an application program memory must be allocated to store that object. In known objected oriented programs, memory is allocated form a common pool of free memory that is available to all application programs, commonly known as the heap. Although the act of allocating memory itself is a relatively simple task if memory is available, continued allocation of memory for new objects without also deallocating memory for objects that are no longer being used will slowly deplete the available memory space. This slow depletion of memory is referred to as a "memory leak", and is a common problem in current object oriented programs. Further, known object oriented programs also continue to create new objects while the application program is running without keeping track of the availability of memory space in the heap. Consequently, any memory leaks may reach a critical point at any time. The obvious consequences of this are program or system failure, and loss of data. Thus, memory allocation and deallocation in object oriented programming, otherwise known as memory management, is of great concern and has traditionally been extremely problematic.

Memory management concerns have previously been addressed by various types of products or programs that manage the deletion of objects, such as well known garbage collection products. Although somewhat effective in reducing the danger of memory leaks, allocation of objects from the heap still proceeds during program execution without any feedback regarding available memory. Thus, it is always possible that insufficient memory will result in program or system failure. Accordingly, programs that manage the deletion of objects do not address a fundamental problem; that in known object oriented programs memory allocation occurs continuously and in ignorance of the state of available memory. Thus, it can never be guaranteed that sufficient memory will be available for the duration of the running time of the application program.

SUMMARY OF THE INVENTION

Accordingly, a need currently exists for a system and method of managing memory in object oriented programs that will ensure that adequate memory will be available at all times throughout program operation so as to avoid program failure and eliminate the problems associated with memory leaks.

In accordance with the present invention, a method is provided for managing memory in an object oriented program that is capable of using a plurality of fixed pool classes and a plurality of objects of those classes. The method includes the steps of constructing a plurality of memory pools each of a predetermined fixed size, where each of the fixed pool classes is associated with one of the plurality of memory pools; and instantiating a new object belonging to a selected one of the fixed pool classes, the instantiating step including the step of allocating memory for the new object from the associated memory pool. Further, when an object of a fixed pool class is deleted, memory is deallocated to the associated memory pool.

Further, in accordance with the present invention a system for managing memory in an object oriented program operating on a computer system is also provided comprising a memory pool class, and a plurality of fixed pool subclasses of the memory pool class, where the object oriented program is capable of using and instantiating objects belonging to the subclasses. The system further includes a plurality of memory pools each of a predetermined fixed size, where each of the plurality of fixed pool subclasses has one of the plurality of memory pools associated therewith, and where the memory for the objects of a selected subclass that are instantiated by the object oriented program is allocated from the associated memory pool. Likewise, when objects of the subclasses are deleted, memory is deallocated to the associated memory pools.

BRIEF DESCRIPTION OF THE DRAWINGS

For a more complete understanding of the present invention and the advantages thereof, reference is now made to the following description taken in conjunction with the accompanying drawings in which like reference numbers indicate like features wherein:

FIG. 1b is a simplified diagram illustrating objects of the class shown in FIG. 1a;

DETAILED DESCRIPTION

Figure 1A:
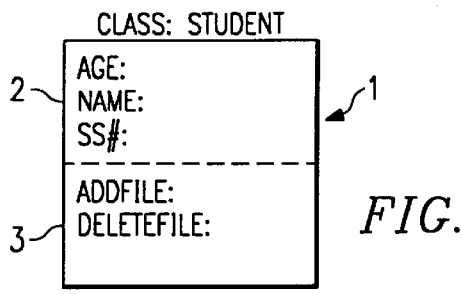
FIG. 1a is a simplified diagram illustrating attributes and methods of a class.
Figure 1B:
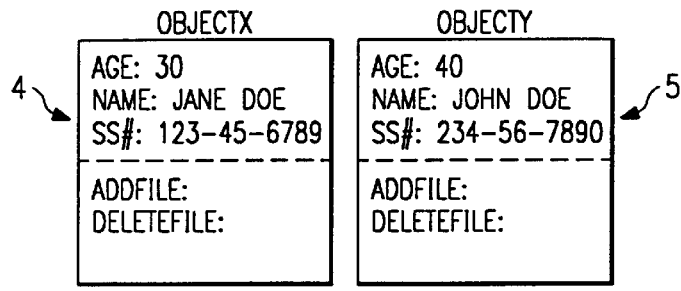

At the root of object-oriented programming are the concepts of classes and objects (or instances) of these classes. A class is a generic description of the attributes or characteristics and of behaviors or methods that all objects within that class may possess. For example, as shown in FIG. 1a, members of the class "Student" 1 may each have as attributes 2 a name, age, and social security number. The methods 3 that can be performed on members of the class "Student" include either to add (addfile) or delete (deletefile) the student represented by the defined attributes from a file, such as a file listing the students enrolled in a particular college course. Each object or instance of the class will contain specific data values corresponding to each generic attribute of the class. For example, as shown in FIG. 1b, for Object X 4 the value of 30 corresponds to the age attribute, and the value 123-45-6789 corresponds to the social security number (SS#) attribute. Likewise, for Object Y 5 the value of 40 corresponds to the age attribute and the value 234-56-7890 corresponds to the social security number attribute. Thus, the values taken on by the object for the various attributes define the state of the object. The methods defined in the class, however, remain the same for all objects in that class, and in the absence of overloading, will also remain the same for all subclasses of that class due to the well known principle of inheritance. Finally, objects are called upon by application programs to perform certain functions by sending messages to the appropriate object. In some instances, these messages require an object to call upon other objects by sending messages to those other objects.

As previously indicated, known object oriented programs create new objects to carry out necessary functions, and allocate memory for those objects from the heap as program execution proceeds. The present invention avoids the disadvantages of these known object oriented programs by providing a system and method for managing memory that allocates and deallocates objects from fixed size memory pools rather than from the heap. The size of the memory pool is such that it is sufficient to store the maximum number of objects that could be concurrently allocated by the application program, and the proper size is set during program initialization. By integrating memory allocation and program initialization, the system and method of the present invention ensures that there will be sufficient memory for object allocation at all times. Further, because objects are only allocated and deallocated from a fixed size memory pool, there is never a danger that memory leaks or like problems will lead to program failure. As will be described below, the inventive system and method applies the principles of overloading and inheritance to ensure that all objects are allocated and deallocated from the appropriate fixed size memory pool rather than from the heap, and therefore, is completely transparent to application programs that call on these objects.

The architecture of the system will now be described with reference to FIG. 2. There are multiple application programs 200 that are each capable of calling on objects that will be allocated and deallocated from fixed size memory pools. These application programs 200 operate in a standard object oriented program environment. In one embodiment, the application programs use the C++ programming language, and thus are linked to a C++ compiler 201. Application programs 200 are also linked to one or more initialization files 202 that contain files and data necessary for program initialization.

Application programs 200 encapsulate a class "MemoryPool" 203, which itself encapsulates the fixed size memory pool scheme. Representative classes, ClassA 204 and ClassB 205, are subclasses of MemoryPool 203, and thus inherit the attributes and methods of the MemoryPool class. ClassA 204 and ClassB 205 are each linked to a fixed size memory pool, PoolA 206 and PoolB 207 respectively, from which all objects within the class are allocated and deallocated, and are therefore, referred to as fixed pool classes. For example, it can be seen that all objects that belong to ClassA 204, such as "Obj. $A_1$" and "Obj. $A_2$" 208, are allocated and deallocated from memory pool PoolA 206; and all objects belonging to ClassB 205, such as "Obj. $B_1$" and "Obj. $B_2$" 209, are allocated and deallocated from memory pool PoolB 207.

Figure 2:
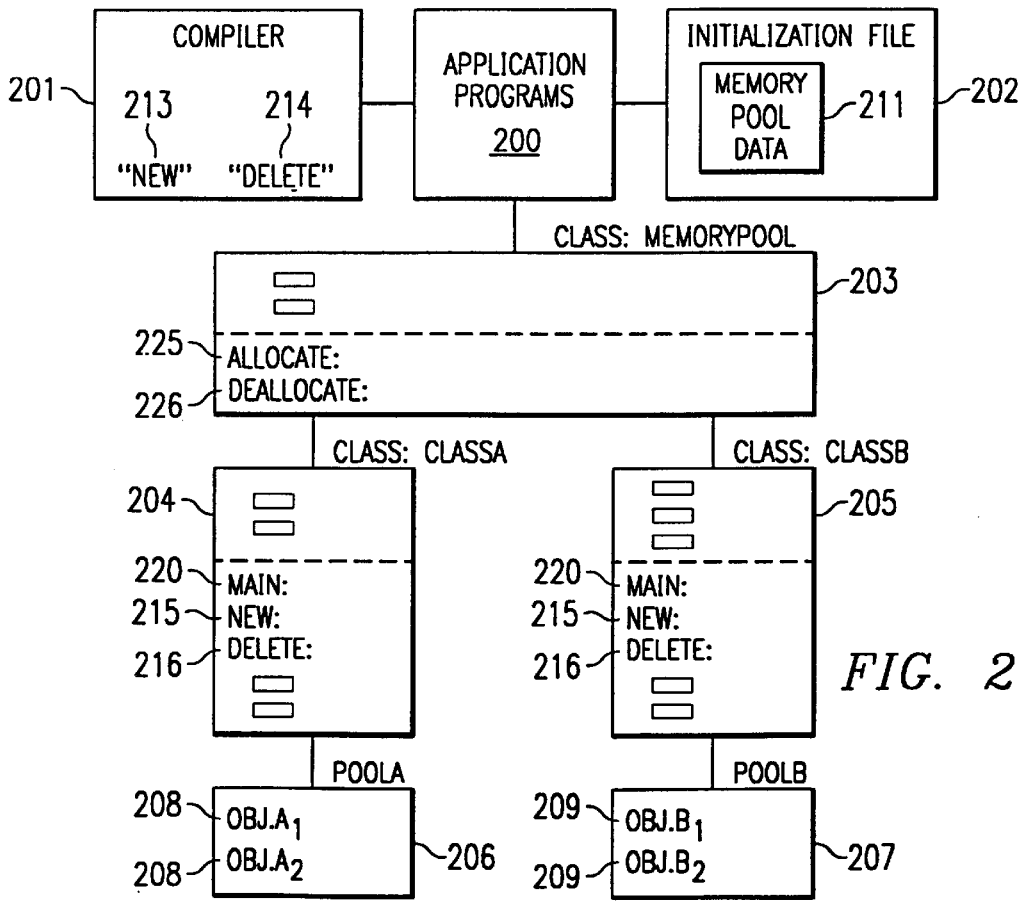
FIG. 2 is a simplified block diagram illustrating the overall architecture of an exemplary system according to the present invention.

Although only two subclasses of MemoryPool 203, and a separate object pool corresponding to each of these subclasses is shown in FIG. 2, one skilled in the art will understand that various other embodiments could also be implemented. For example, additional layers of subclasses could be included, as could additional numbers of subclasses at each layer. Further, multiple classes may also allocate and deallocate objects from the same object pool.

As indicated, all classes encapsulated by MemoryPool 203 will allocate and deallocate objects from a designated fixed size memory pool rather than from the heap. According to the present invention, the fixed size memory pools 206, 207 are constructed during program initialization, and because all objects are allocated and deallocated from the pool(s), the size of each memory pool is critical and must be determined prior to program run time. The size of the pool must be sufficient to store the maximum number of objects that could be concurrently allocated during program operation in order to avoid memory deficiencies. Thus, both the maximum number of concurrently allocable objects and the size of the objects must be accurately determined before the memory pool can be created. This number can be determined by calculation, experimental evidence, extrapolation, testing or the like. Once ascertained, information regarding the size of each object and the maximum size of the memory pool (the "memory pool data") is stored in one or more files, such as initialization files 202, that can be accessed by the application program that will call on these objects.

Figure 3:
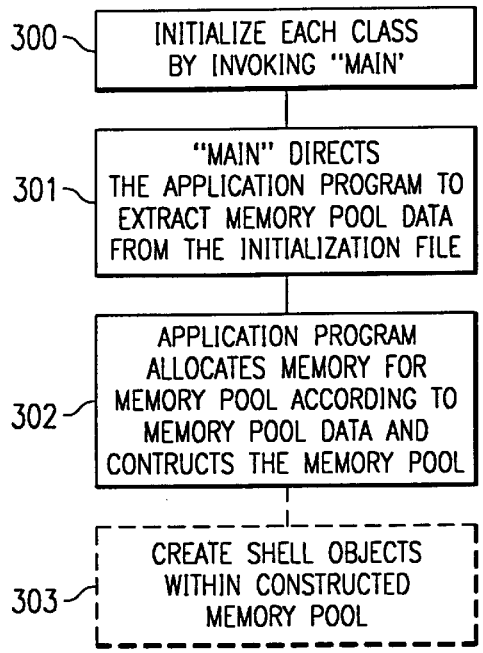
FIG. 3 is a simplified flow chart illustrating the process of constructing fixed size memory pools.

Assuming the necessary data has been stored in the initialization file 202, memory pool initialization will then proceed as shown in FIG. 3. On program startup, the application program 200 will first initialize those classes that are to be called on during program execution (step 300). As is well known in the art, each class includes a class specific method "main" (220 in FIG. 2) that is called on to initialize the class. For classes whose objects are allocated and deallocated from fixed size memory pools, "main" will direct the application program to go to the appropriate initialization file 202, parse through that file, and extract from that file the memory pool data corresponding to that class (step 301). Once the information is obtained, the application program 200 will, in step 302, construct a memory pool of the appropriate size by allocating from available memory the amount of memory for that pool that is specified by the memory pool data 211 in the initialization file 202.

In one embodiment, the application program will allocate the memory space, and also perform the additional step of creating the proper number of "shell" objects within that allocated space (step 303). A "shell" object is an object that has been created and is stored within the allocated memory space, but has not yet been assigned data values for the various named attributes to define the state of that object. The creation of "shell" objects is advantageous when the number of objects called on at any one time by an application program is far less than the number of physical possibilities. Under such circumstances the data for each object may be stored elsewhere, such as in a separate database (502 in FIG. 5). When needed, an object "shell" will be taken from the memory pool and filled with the appropriate data from the database, as will be described in further detail below.

Accordingly, all fixed size memory pools are constructed during initialization. For those classes that allocate and deallocate objects from their own memory pools, class initialization will include construction of such a pool. For those that share a memory pool, as in an alternative embodiment of the present invention, the method "main" in these classes will adjust for this by simply not directing the application program to construct a new and separate memory pool.

Now that all necessary fixed size memory pools have been constructed, the manner by which objects are allocated and deallocated from the appropriate pools rather than from the heap will now be described with reference to FIGS. 2 and 4. As is well known, the C++ operators that manage memory allocation are "new" and "delete" (213 and 214 in FIG. 2). "New", followed by the appropriate pointer to a designated class, causes memory to be allocated from the heap to create a new object of that class, and "delete" causes a specified object to be deleted from memory, thereby deallocating memory to the heap. It is also well known, however, that any C++ operators, including "new" and "delete", can be overloaded by a subclass that uses the same operator name, but redefines the method. For example, as shown in FIG. 2, each of subclasses ClassA 204 and ClassB 205 include methods "new" 215 and "delete" 216. The methods within subclasses ClassA and ClassB will be referred to hereinafter as NEW and DELETE only to avoid confusion, but it is to be understood that these methods are called by the same name as the C++ operators "new" and "delete" so as to overload the C++ operators. Although called on by the same name, NEW and DELETE have been redefined to contain additional parameters that instruct that memory allocation for the desired object (or deallocation for an object to be deleted) is to be from a specified fixed size memory pool rather than from the heap. Thus, NEW and DELETE overload the C++ operators "new" and "delete", and cause all objects for that class to be allocated and deallocated from the named object pool.

Figure 4:
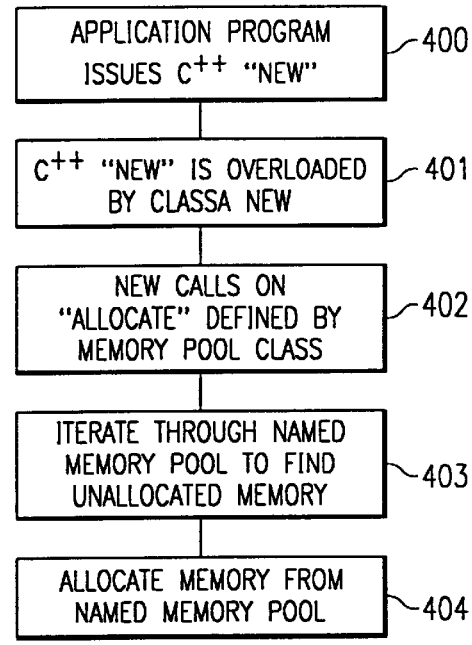
FIG. 4 is a simplified flow chart illustrating the process of allocating an object from a fixed size memory pool.

Referring now to FIG. 4, the application program will first send the C++ message "new" to a particular class, i.e. ClassA (step 400). Because ClassA includes its own NEW method, receipt of the C++ "new" message from the application program will be overload by NEW. In one embodiment, NEW calls on another method "allocate" 402 (see also 225 in FIG. 2), which is the method that actually causes the object to be allocated from the designated pool, and which is defined by MemoryPool 203 and inherited by ClassA. To perform the actual allocation, "allocate" will go to the memory pool named in the parameters of NEW, and proceed to iterate through the memory space in that memory pool until it locates a sufficient amount of unallocated memory 403. It will then allocate that located space for the new object 404.

Figure 5:
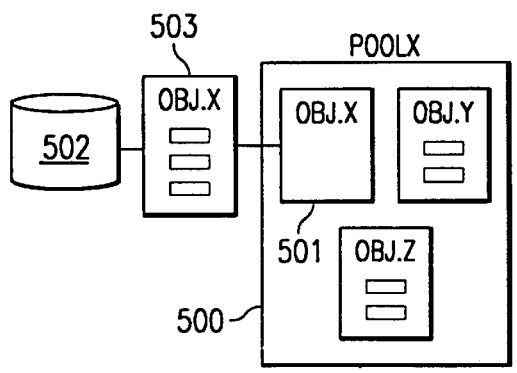
FIG. 5 is a simplified illustration of a fixed size memory pool that contains object "shells", and a separate database for storing object data.

As was stated above, in one embodiment object "shells" may be created within the fixed size memory pool during program initialization. FIG. 5 illustrates multiple object "shells" 501 within object pool PoolX 500. Under such circumstances, the data for all objects is stored elsewhere, such as in a separate database 502. When an object is allocated from the pool, it is removed from the pool and the data necessary to define the state of the object is extracted from database 502 and assigned to the object. This defined object 503 can then be used by the application program. If during the use of the object changes are made to the object's data, the database will be updated with the new information. The object will be "active" while needed to perform a particular function, and returned to the pool thereafter for use again at a later time.

Figure 6:
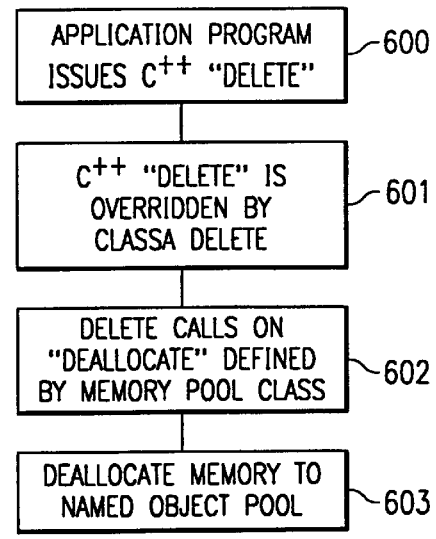
FIG. 6 is a simplified flow chart illustrating the process of deallocating an object from a fixed size memory pool.

The C++ operator "delete" is also overloaded by DELETE in a manner analogous to that by which the C++ operator "new" is overloaded. Referring to FIG. 6, when the useful life of an object has expired, the application program will send the C++ "delete" message to a particular object of a particular class (step 600). As any class that encapsulates the fixed size memory pool scheme includes its own method DELETE (215 in FIG. 2), the C++ operator "delete" is overloaded by DELETE at the subclass level, i.e. ClassA 204, in step 601. DELETE differs from "delete" in that it contains additional parameters that name the specific memory pool from which the object is to be deleted. In one embodiment, DELETE further calls on a method "deallocate" (226 in FIG. 2) defined by MemoryPool 203 and inherited by ClassA (602), that will direct the deletion of the object from the named memory pool in which it resides in step 603. If the memory pool is of the type that includes object "shells", the data will be deleted from the object, and the empty object "shell" returned to the memory pool.

From the above description it is clear that the present invention provides a new and superior system and method for managing memory in object oriented programs. By allocating and deallocating objects from fixed size memory pools rather than from the heap, and by constructing these fixed size memory pools during initialization, the inventive system and method ensures that memory sufficient to support a particular object oriented program will be available throughout the run time of the application program.

Other modifications of the invention described above will be obvious to those skilled in the art, and it is intended that the scope of the invention be limited only as set forth in the appended claims.

What is claimed is:

1. A method for managing memory in an object oriented program, said object oriented program being capable of using a plurality of fixed pool classes and a plurality of objects belonging to said fixed pool classes, comprising the steps of:

determining a maximum number of objects that may be allocated by the object oriented program for each fixed pool class;

determining a size of each object that may be allocated;

constructing a plurality of memory pools upon initialization of the object oriented program, each of said plurality of memory pools having a predetermined fixed size, each of said plurality of fixed pool classes being associated with one of said plurality of memory pools, wherein a size of each memory pool is determined from the maximum number of and size of objects that may be concurrently allocated for each associated fixed pool class during operation of the object oriented program; and instantiating a new object belonging to a selected one of said fixed pool classes, said instantiating step including the step of allocating memory for said new object from said associated memory pool.

2. A method according to claim 1, wherein said instantiating step further comprises:

invoking a first object creation method intended to allocate memory for said new object from memory other than that of said associated memory pool, said first object creation method being inherited by said selected fixed pool class;

overloading said first object creation method with a second object creation method defined by said selected fixed pool class, said second object creation method causing memory for said new object to be allocated from said associated memory pool.

3. A method according to claim 2, further comprising the step of:
  deleting an existing object belonging to one of said fixed pool classes, said deletion causing the deallocation of memory from said existing object to the memory pool associated with the fixed pool class to which said existing object belongs.

4. A method according to claim 3, wherein said deleting step further comprises:
  invoking a first object deletion method intended to deallocate memory from said existing object to memory other than that of said associated memory pool, said first object deletion method being inherited by the fixed pool class to which said existing object belongs; and
  overloading said first object deletion method with a second object deletion method defined by said fixed pool class to which said existing object belongs, said second object deletion method causing memory to be deallocated from said existing object to said associated memory pool.

5. A method according to claim 1, wherein said constructing step further comprises:
  extracting from an initialization file memory pool data corresponding to each of said memory pools to be constructed, said memory pool data including a size of said memory pool to be constructed, and a size of objects to be allocated and deallocated from said memory pool;
  allocating sufficient memory to construct said plurality of memory pools according to said corresponding memory pool data.

6. A method according to claim 5, wherein prior to said instantiation step said plurality of fixed pool classes are initialized, and said constructing step occurs during said initialization.

7. A method according to claim 1, wherein said constructing step comprises associating each of said plurality of fixed pool classes with a different one of said plurality of memory pools.

8. A method according to claim 1, wherein said constructing step comprises associating at least two of said plurality of fixed pool classes with a selected one of said plurality of memory pools.

9. A system for managing memory in an object oriented program operating on a computer, comprising:
  a memory pool class;
  a plurality of fixed pool subclasses of said memory pool class, said object oriented program being capable of using and instantiating objects belonging to said plurality of fixed pool subclasses;
  a plurality of memory pools each of a predetermined fixed size constructed during initialization of the object oriented program, each of said plurality of fixed pool subclasses having one of said plurality of memory pools associated therewith, wherein a size of each memory pool is determined from the maximum number of and size of objects that may be concurrently allocated for each associated fixed pool subclass during operation of the object oriented program;
  wherein memory for said objects of each of said fixed pool subclasses instantiated by said object oriented program are allocated from said associated memory pool.

10. A system according to claims 9, wherein each of said plurality fixed pool of subclasses defines an object creation method that causes memory for said objects instantiated by said object oriented program to be allocated from said associated memory pool.

11. A system according to claim 10, wherein said defined object creation method overloads an inherited object creation method intended to cause said memory to be allocated from memory other than that of said associated memory pool.

12. A system according to claim 11, further comprising an initialization file for storing memory pool data for each of said memory pools, said memory pool data including the predetermined size of each of said memory pools, and the size of objects to be allocated from each of said memory pools.

13. A method for managing memory in an object oriented program, said object oriented program being capable of using a plurality of fixed pool classes and a plurality of objects belonging to said fixed pool classes, comprising the steps of:
  constructing a plurality of memory pools, each of said memory pools having a predetermined fixed size, and each of said plurality of fixed pool classes being associated with one of said plurality of memory pools, wherein a size of each memory pool is determined from the maximum number of and size of objects that may be allocated for each associated fixed pool class;
  constructing a plurality of object shells within a memory pool associated with a selected fixed pool class, each of said object shells being capable of becoming a defined object of said selected fixed pool class by receiving attribute data, said attribute data being stored in a database, wherein each object shell has not been assigned data values to define a state of an object; and
  instantiating a new object belonging to said selected fixed pool class by retrieving said attribute data from said database and inserting said attribute data into one of said object shells of said associated memory pool.

14. A method according to claim 13, wherein said instantiating step further comprises:
  invoking a first object creation method intended to allocate memory for said new object from memory other than that of said associated memory pool, said first object creation method being inherited by said selected fixed pool class; and
  overloading said first object creation method with a second object creation method defined by said selected fixed pool class, said second object creation method causing memory for said new object to be that of an object shell within said associated memory pool.

15. A method according to claim 14, further comprising the steps of:
  deleting attribute data from an existing object of a fixed pool class associated with a memory pool that includes object shells; and
  returning said object shell to said associated memory pool.

16. A method according to claim 13, wherein said deleting step further comprises:
  invoking a first object deletion method intended to deallocate memory from said existing object to memory other than that of said associated fixed memory pool, said first object deletion method being inherited by the fixed pool class to which said existing object belongs;
  overloading said first object deletion method with a second object deletion method defined by the fixed pool class to which said existing object belongs, said second object deletion method causing said attribute data to be deleted and said object to be returned to said associated memory pool.

17. A method according to claim 13, wherein said constructing step further comprises:

extracting from an initialization file memory pool data corresponding to each of said memory pools to be constructed, said memory pool data including a size of said memory pool to be constructed, and a size of objects to be allocated and deallocated from said memory pool;

allocating sufficient memory to construct said plurality of memory pools according to said corresponding memory pool data.

18. A method according to claim 17, wherein prior to said constructing step said plurality of fixed pool classes are initialized, and said constructing step occurs during said initialization.

19. A method according to claim 13, wherein said constructing step comprises associating each of said plurality of fixed pool classes with a different one of said plurality of memory pools.

20. A method according to claim 13, wherein said constructing step comprises associating at least two of said plurality of fixed pool classes with a selected one of said plurality of memory pools.

* * * * *